United States Patent
Roessle et al.

(10) Patent No.: US 10,837,515 B2
(45) Date of Patent: Nov. 17, 2020

(54) DAMPER BAFFLE TUBE WITH ELASTOMERIC SKIRT

(71) Applicant: Tenneco Automotive Operating Company Inc., Lake Forest, IL (US)

(72) Inventors: Matthew L. Roessle, Temperance, MI (US); Darrell G. Breese, Ypsilanti, MI (US); Thomas P. Mallin, Temperance, MI (US); Michael S. Weaver, Plymouth, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/272,425

(22) Filed: Feb. 11, 2019

(65) Prior Publication Data

US 2020/0256419 A1    Aug. 13, 2020

(51) Int. Cl.
*F16F 9/46*    (2006.01)
*F16F 9/18*    (2006.01)
(Continued)

(52) U.S. Cl.
CPC .............. *F16F 9/464* (2013.01); *B60G 13/08* (2013.01); *B60G 17/08* (2013.01); *F16F 9/185* (2013.01);
(Continued)

(58) Field of Classification Search
CPC ......... B60G 13/08; B60G 17/08; F16F 9/464; F16F 9/3257; F16F 9/3207; F16F 9/3235;
(Continued)

(56) References Cited

U.S. PATENT DOCUMENTS 2,324,058 A    7/1943    Boor
2,357,920 A    9/1944    Whisler, Jr.
(Continued)

FOREIGN PATENT DOCUMENTS

DE    3822970 A1    1/1990
EP    0261427 A2    3/1988
(Continued)

OTHER PUBLICATIONS

International Search Report and Written Opinion issued in PCT/US2020/016789, dated Jun. 4, 2020.

*Primary Examiner* — Vishal R Sahni
(74) *Attorney, Agent, or Firm* — Harness Dickey & Pierce

(57) ABSTRACT

A shock absorber with a pressure tube, a reserve tube, and a piston slidably disposed within the pressure tube to define first and second working chambers. A reservoir chamber is positioned between the pressure tube and the reserve tube. A damper baffle tube, positioned in the reservoir chamber, defines a baffle tube chamber between the pressure tube and the damper baffle tube. One or more electromechanical valves are positioned in fluid communication with the first working chamber and the baffle tube chamber. The damper baffle tube includes a compliant portion that has a sealing surface configured to move into and out of contact with the pressure tube in response to fluctuations in fluid pressure in the baffle tube chamber so as to form a check valve that holds a constrained volume of hydraulic fluid in the baffle tube chamber.

11 Claims, 10 Drawing Sheets

(51) Int. Cl.
*B60G 13/08* (2006.01)
*B60G 17/08* (2006.01)
*F16F 9/32* (2006.01)

(52) U.S. Cl.
CPC ........ *F16F 9/3257* (2013.01); *F16F 2230/06* (2013.01)

(58) Field of Classification Search
CPC .... F16F 9/325; F16F 9/346; F16F 9/36; F16F 9/362; F16F 9/364; F16F 9/062; F16F 9/065; F16F 9/066; F16F 9/185
See application file for complete search history.

(56) References Cited

U.S. PATENT DOCUMENTS

| | | | |
|---|---|---|---|
| 2,432,937 A | 12/1947 | Rossman | |
| 2,717,669 A | 9/1955 | Stock | |
| 3,225,870 A | 12/1965 | Heckethorn | |
| 3,302,756 A | 2/1967 | McIntyre | |
| 3,329,241 A | 7/1967 | Palmer | |
| 3,722,639 A | 3/1973 | Keijzer et al. | |
| 3,904,002 A | 9/1975 | Adrian et al. | |
| 3,945,474 A | 3/1976 | Palmer | |
| 4,044,865 A | 8/1977 | Tourunen | |
| 4,445,598 A * | 5/1984 | Brambilla | F16F 9/364 188/315 |
| 4,971,180 A | 11/1990 | Kobayashi et al. | |
| 5,000,299 A | 3/1991 | Goto et al. | |
| 5,070,970 A | 12/1991 | Johnston et al. | |
| 5,113,980 A | 5/1992 | Furrer et al. | |
| 5,353,897 A * | 10/1994 | Woessner | F16F 9/512 188/267 |
| 5,353,898 A | 10/1994 | Handke et al. | |
| 5,449,055 A | 9/1995 | Geiling et al. | |
| 5,598,904 A | 2/1997 | Spyche, Jr. | |
| 5,738,191 A | 4/1998 | Forster | |
| 5,924,528 A | 7/1999 | Vermolen et al. | |
| 6,283,259 B1 | 9/2001 | Nakadate | |
| 6,321,888 B1 | 11/2001 | Reybrouck et al. | |
| 6,443,271 B2 | 9/2002 | Schmidt | |
| 6,913,127 B2 | 7/2005 | Holiviers et al. | |
| 7,347,307 B2 * | 3/2008 | Joly | F16F 9/46 188/266.5 |
| 8,434,772 B2 | 5/2013 | Keil et al. | |
| 8,616,351 B2 * | 12/2013 | Roessle | F16F 9/185 188/282.4 |
| 9,217,483 B2 | 12/2015 | Dunaway et al. | |
| 9,291,229 B2 | 3/2016 | Shibahara | |
| 9,303,711 B2 | 4/2016 | Nakajima | |
| 9,388,877 B2 | 7/2016 | Konakai et al. | |
| 9,404,551 B2 | 8/2016 | Roessle et al. | |
| 9,441,698 B2 | 9/2016 | Suzuki et al. | |
| 9,551,395 B2 | 1/2017 | Fujihara | |
| 9,662,952 B2 | 5/2017 | Funke et al. | |
| 9,739,330 B2 | 8/2017 | Reybrouck et al. | |
| 9,879,746 B2 | 1/2018 | Keil et al. | |
| 10,054,182 B2 | 8/2018 | Roessle et al. | |
| 2003/0019701 A1 | 1/2003 | Hodgson | |
| 2005/0056504 A1 | 3/2005 | Holiviers | |
| 2005/0061593 A1 | 3/2005 | DeGronckel et al. | |
| 2005/0067240 A1 | 3/2005 | Holiviers et al. | |
| 2007/0221459 A1 | 9/2007 | Kobelev et al. | |
| 2007/0278028 A1 | 12/2007 | Fought et al. | |
| 2009/0120749 A1 | 5/2009 | Kolz | |
| 2014/0090941 A1 | 4/2014 | Shibahara | |
| 2014/0238797 A1 * | 8/2014 | Blankenship | F16F 9/463 188/314 |
| 2014/0262652 A1 | 9/2014 | Roessle et al. | |
| 2015/0152935 A1 | 6/2015 | Ogawa | |
| 2016/0017950 A1 | 1/2016 | Nakano et al. | |
| 2016/0059656 A1 | 3/2016 | Funke et al. | |
| 2016/0082803 A1 | 3/2016 | Dunaway et al. | |
| 2017/0299009 A1 | 10/2017 | Murakami et al. | |
| 2018/0172105 A1 * | 6/2018 | Roessle | B60G 13/08 |
| 2019/0186581 A1 * | 6/2019 | Roessle | F16F 9/062 |
| 2019/0351724 A1 * | 11/2019 | Roessle | B60G 13/08 |

FOREIGN PATENT DOCUMENTS

| | | |
|---|---|---|
| GB | 1583278 A | 1/1981 |
| JP | 2002257179 A | 9/2002 |
| JP | 201100247371 A | 12/2011 |
| JP | 2016061314 A | 4/2016 |
| KR | 20100089490 A | 8/2010 |
| WO | 2016067733 A1 | 5/2016 |
| WO | 2018112375 A1 | 6/2018 |

* cited by examiner

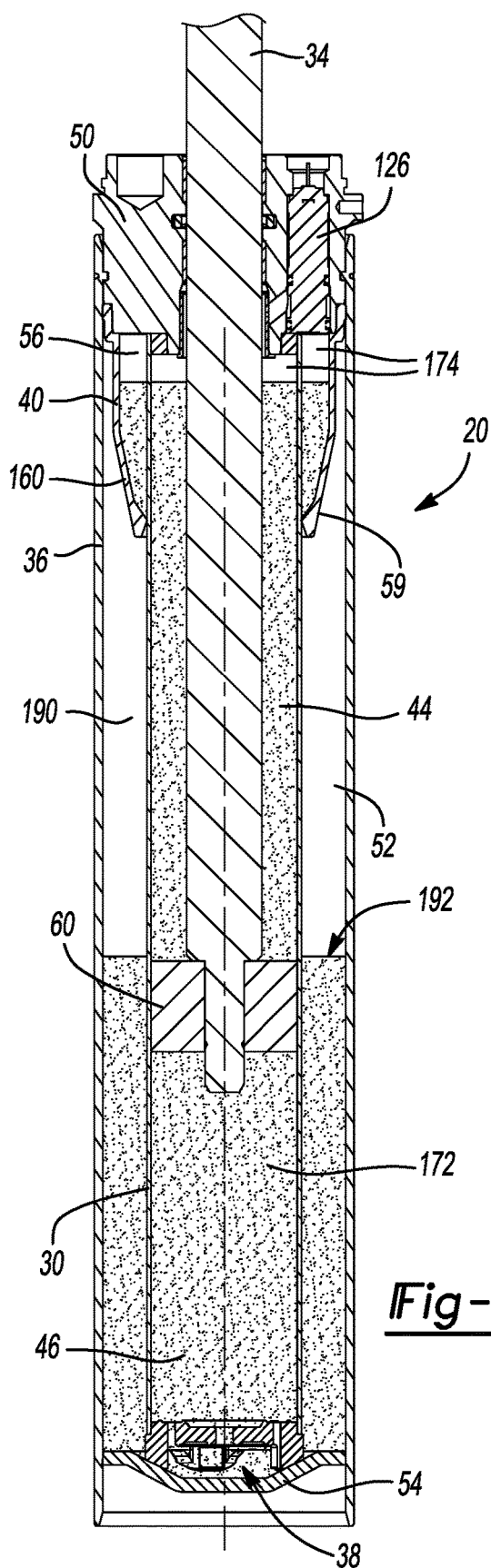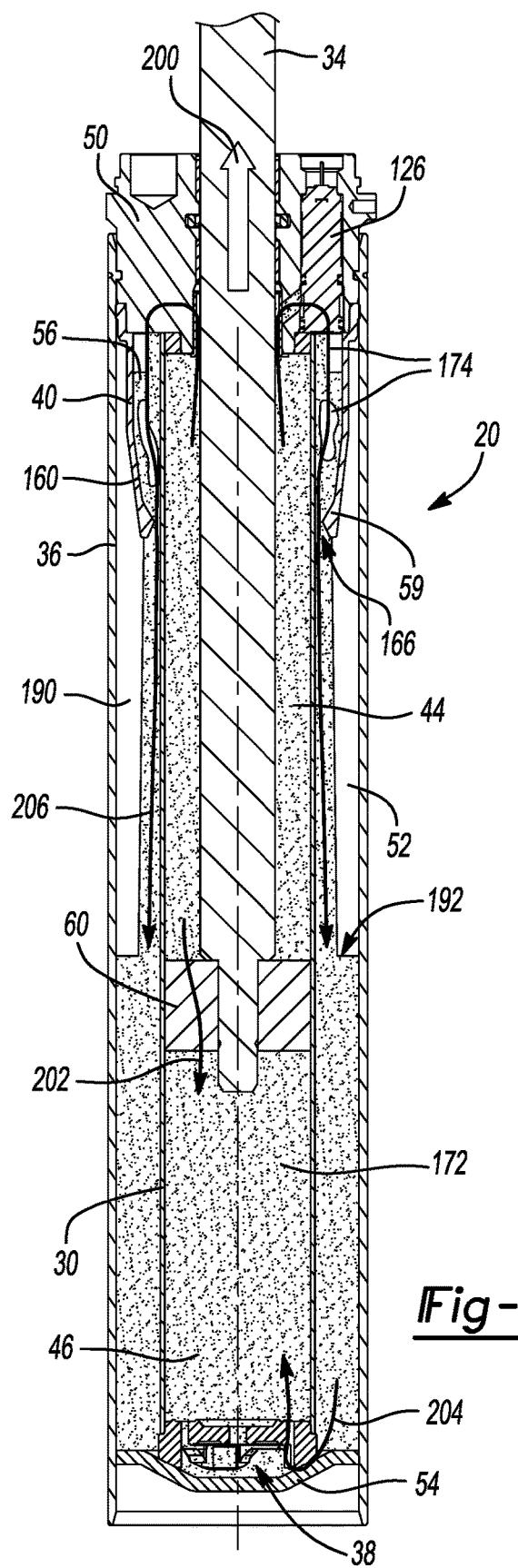

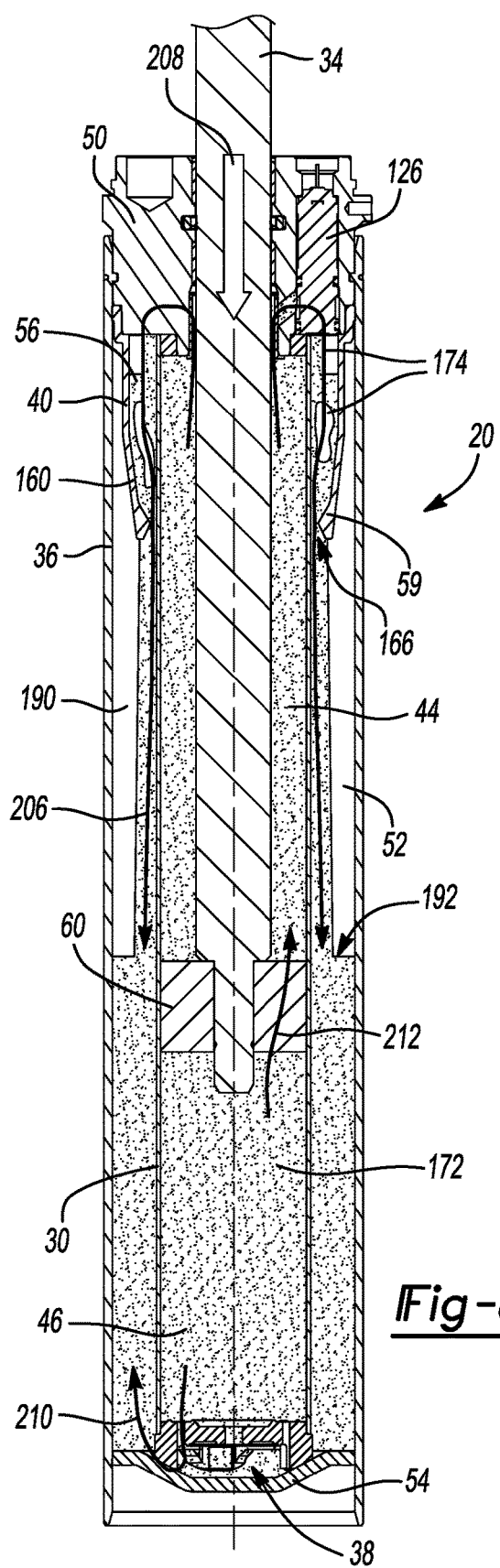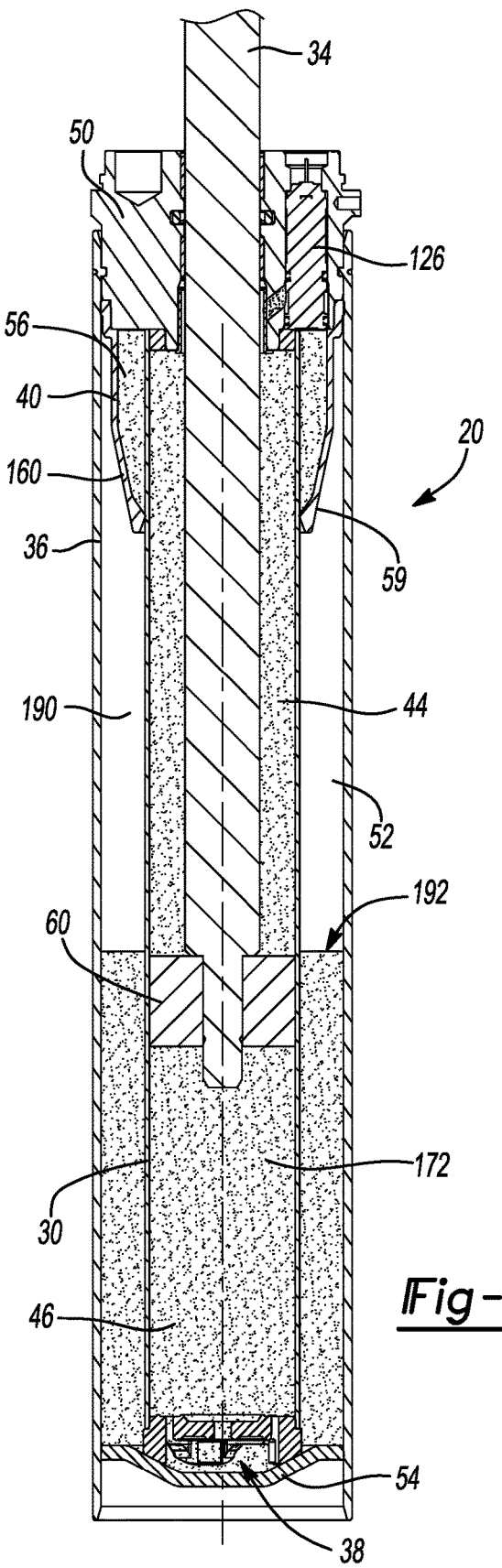

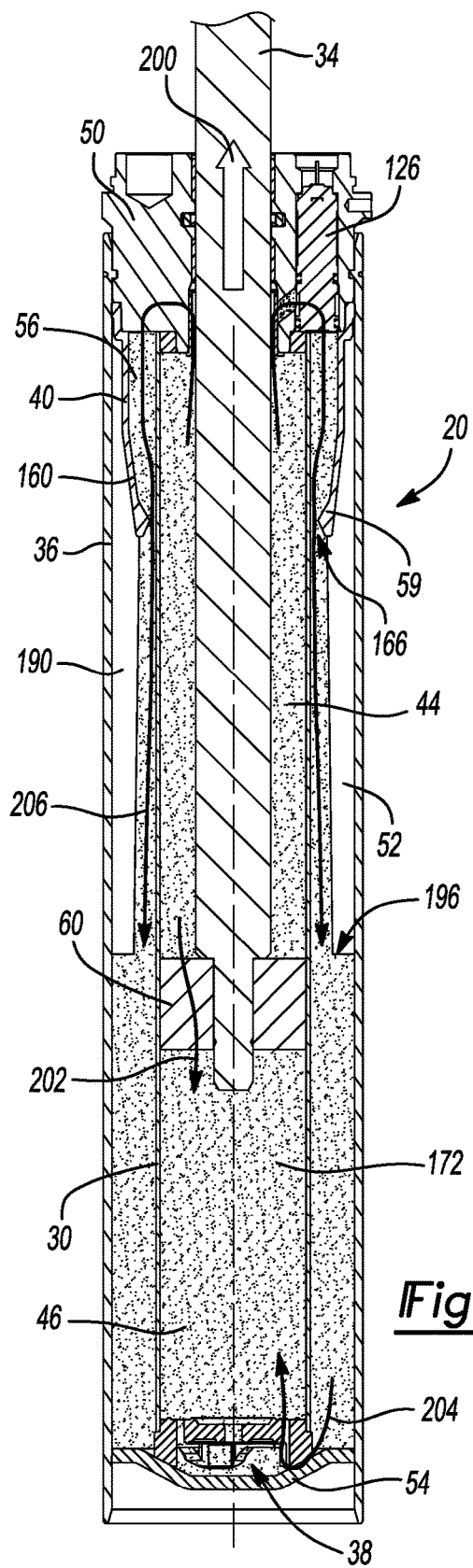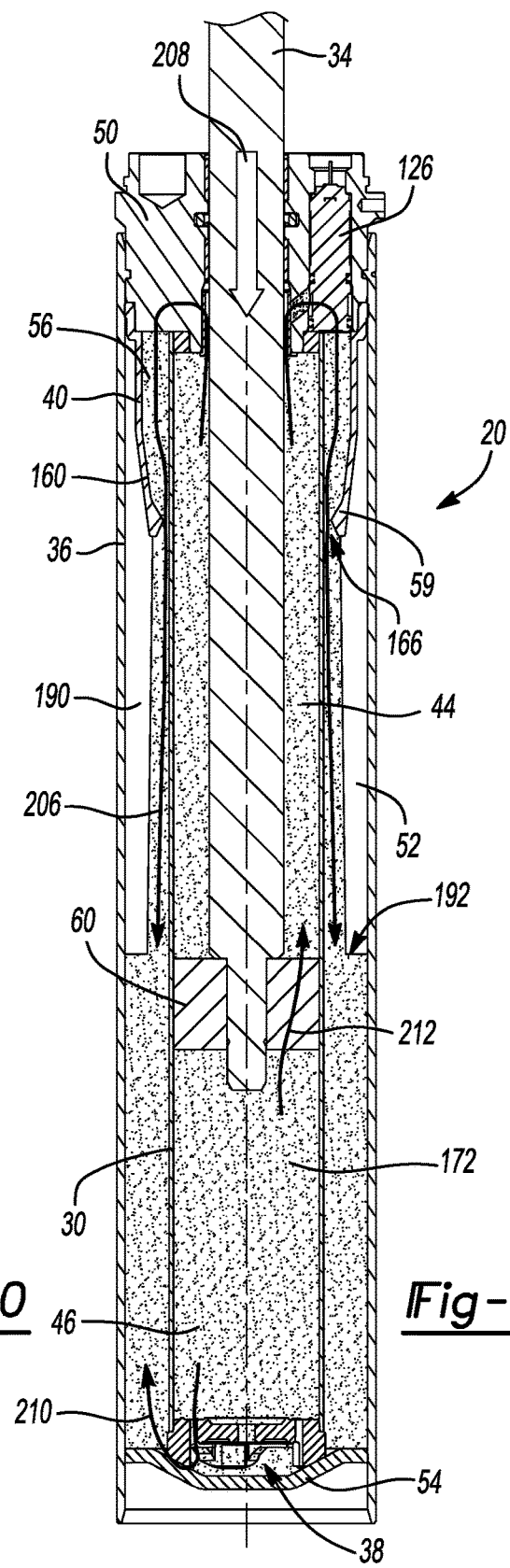

DAMPER BAFFLE TUBE WITH ELASTOMERIC SKIRT

FIELD

The present disclosure relates generally to hydraulic dampers or shock absorbers for use in a suspension system such as a suspension system for automotive vehicles. More particularly, the present disclosure relates to a damper baffle tube with a compliant portion formed by an elastomeric skirt.

BACKGROUND

This section provides background information related to the present disclosure which is not necessarily prior art.

In general, conventional shock absorbers produce damping force characteristics based on a velocity of a piston rod that translates relative to a body of the shock absorber. The shock absorber includes a valve through which oil flows during movement of the piston rod. A pressure differential is generated within the shock absorber based on the configuration and location of the valve. The working pressures provide a resistive or damping force between the piston rod and the body of the shock absorber to provide a desired damping force characteristic.

Electronically adjustable shock absorbers are also available. These shock absorbers produce damping force characteristics as well, but the damping force is adjustable over a damping force range. As such, electronically-adjustable shock absorbers may provide multiple damping force curves for the same piston rod velocity.

Both conventional and electronically-adjustable shock absorbers may exhibit a lower magnitude of damping force than desired if an insufficient oil fluid volume is present in the shock absorber reservoir chamber or if the fluid is aerated. Many shock absorbers are configured as twin tube shock absorbers where the reservoir chamber contains both a liquid oil fluid and a pressurized gas within the same chamber. The oil fluid level within the reservoir chamber changes during shock absorber operation but the shock absorber is configured to maintain a minimum oil level at all times. In certain shock absorbers, the physical position of the valves relative to the liquid level in the reservoir chamber may induce a mixing of gas and liquid thereby aerating the liquid oil. A resultant lag of damping force occurs due to the compressibility of the gas within the liquid. It is at least one object of the present disclosure to mitigate aeration of the liquid within the shock absorber to minimize a lag in providing a target damping force.

U.S. Pat. No. 10,054,182, the disclosure of which is expressly incorporated herein by reference, addresses the oil aeration problem noted above by providing a baffle tube in the reservoir chamber. The disclosed baffle tube disclosed in this reference is a one-piece molded component that contains an o-ring seal between the upper end of the baffle tube and the reserve tube. While this arrangement mitigates aeration of the hydraulic fluid in the reservoir chamber, air or gas can become entrapped in the baffle tube chamber and/or upper working chamber of the pressure tube. For example, air entrapment might occur during initial building of the shock absorber or when the shock absorber lies horizontally during shipment. If the shock absorber cannot be adequately self-primed, then the entrapped air could result in poor performance due to aeration or lag of the shock damping force versus rod displacement during usage.

There are also cost challenges with the existing baffle tubes. The baffle tube length is customized for each damper application. This is due to the fact that the distance from the bottom end of the baffle tube to the base cup must be within a defined range. Therefore, this has a cost impact due to the inventory of part numbers required for different length variants of shock absorbers.

SUMMARY

This section provides a general summary of the disclosure, and is not a comprehensive disclosure of its full scope or all of its features.

In accordance with several aspects of the present disclosure a shock absorber with a pressure tube and a reserve tube is disclosed. The pressure tube extends between a first pressure tube end and a second pressure tube end. A piston, attached to a piston rod, is slidably disposed within the pressure tube to define first and second working chambers. The first working chamber extends between the piston and the first pressure tube end and the second working chamber extends between the piston and the second pressure tube end. The piston includes one or more fluid passages that connect the first working chamber with the second working chamber.

The reserve tube of the shock absorber is disposed around the pressure tube and defines a reservoir chamber that is positioned between the pressure tube and the reserve tube. A damper baffle tube is positioned radially outward from the pressure tube and defines a baffle tube chamber between the pressure tube and the damper baffle tube. One or more electromechanical valves are positioned in fluid communication with the first working chamber and the baffle tube chamber. More specifically, each electromechanical valve includes an inlet positioned in fluid communication with the first working chamber and an outlet positioned in fluid communication with the baffle tube chamber. The damper baffle tube includes a compliant portion surrounding the pressure tube. The compliant portion has a sealing surface that is configured to move into and out of contact with the pressure tube in response to fluctuations in fluid pressure in the baffle tube chamber and more specifically in response to the pressure differential between the baffle tube chamber and the reservoir chamber. As a result, the compliant portion of the damper baffle tube forms a check valve that holds a constrained volume of hydraulic fluid at the outlet of the one or more electromechanical valves.

Advantageously, this arrangement reduces aeration of the hydraulic fluid in the reservoir chamber while also reducing air entrapment in the first working chamber and the baffle tube chamber. The check valve created by the compliant portion of the damper baffle tube allows gas/air pockets in the first working chamber and the damper baffle tube chamber to escape into the reservoir chamber within a few priming strokes of the shock absorber. It can take much longer to purge gas/air pockets out the first working chamber and baffle tube chamber in prior designs where fluid volume is not retained in the baffle tube chamber (i.e., in designs where fluid is free to run out of the baffle tube chamber).

Further areas of applicability and advantages will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a side cross-sectional view of the shock absorber illustrated in FIG. 2 before the shock absorber has been primed;

FIG. 7 is a side cross-sectional view of the shock absorber illustrated in FIG. 6 being primed by an extension stroke;

FIG. 8 is a side cross-sectional view of the shock absorber illustrated in FIG. 6 being primed by a compression stroke;

FIG. 9 is a sided cross-sectional view of the shock absorber illustrated in FIG. 2 after the shock absorber has been primed;

FIG. 10 is a side cross-sectional view of the shock absorber illustrated in FIG. 9 during an extension stroke;

FIG. 11 is a side cross-sectional view of the shock absorber illustrated in FIG. 9 during a compression stroke;

Corresponding reference numerals indicate corresponding parts throughout the several views of the drawings.

DETAILED DESCRIPTION

Figure 1:
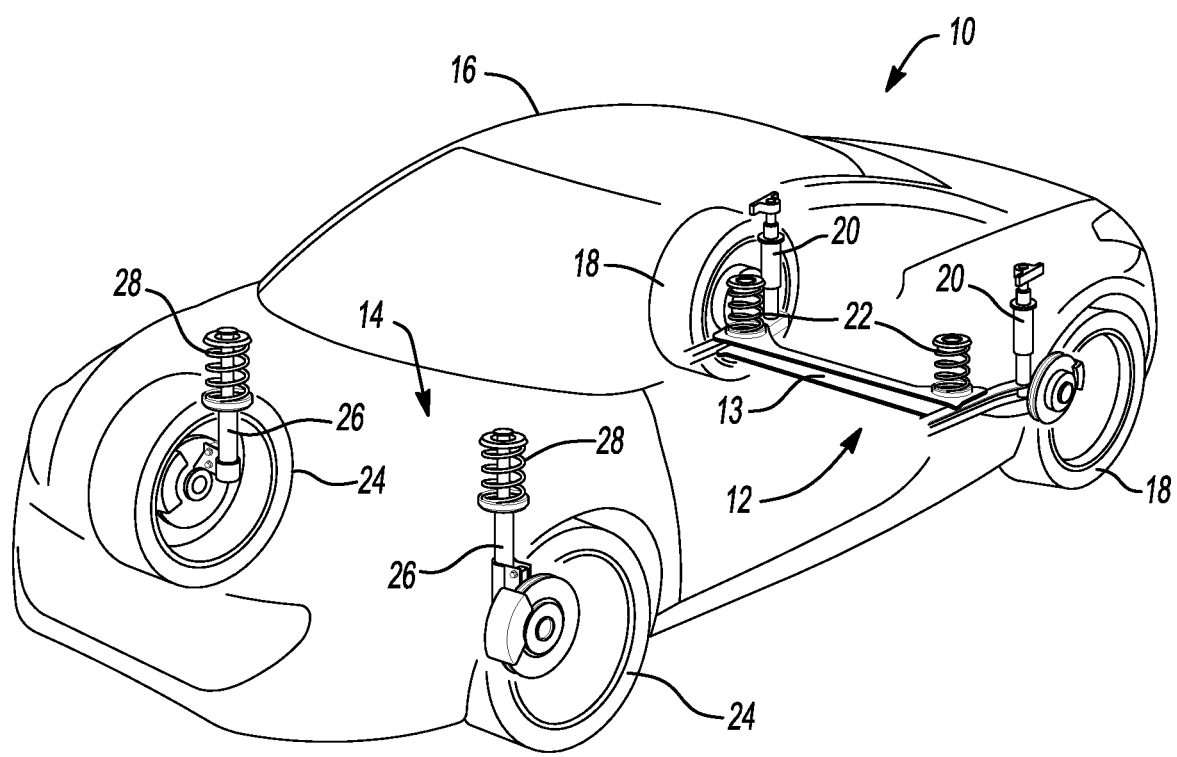
FIG. 1 is an illustration of an automobile having shock absorbers that incorporate the damper baffle tube of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses. FIG. 1 illustrates a vehicle 10 with a suspension system. More specifically, the vehicle 10 includes a rear suspension 12, a front suspension 14, and a body 16.

Rear suspension 12 has a transversely extending rear axle assembly 13 adapted to operatively support a pair of rear wheels 18. The rear axle is attached to body 16 by a pair of rear shock absorbers 20 and by a pair of rear springs 22. Similarly, front suspension 14 includes a transversely extending front axle assembly (not shown) to operatively support a pair of front wheels 24. The front axle assembly is attached to body 16 by a pair of front shock absorbers 26 and by a pair of front springs 28.

Shock absorbers 20 and 26 serve to dampen the relative motion of the unsprung portion (i.e., front and rear suspensions 12, 14) with respect to the sprung portion (i.e., body 16) of vehicle 10. While the vehicle 10 has been depicted as a passenger car, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
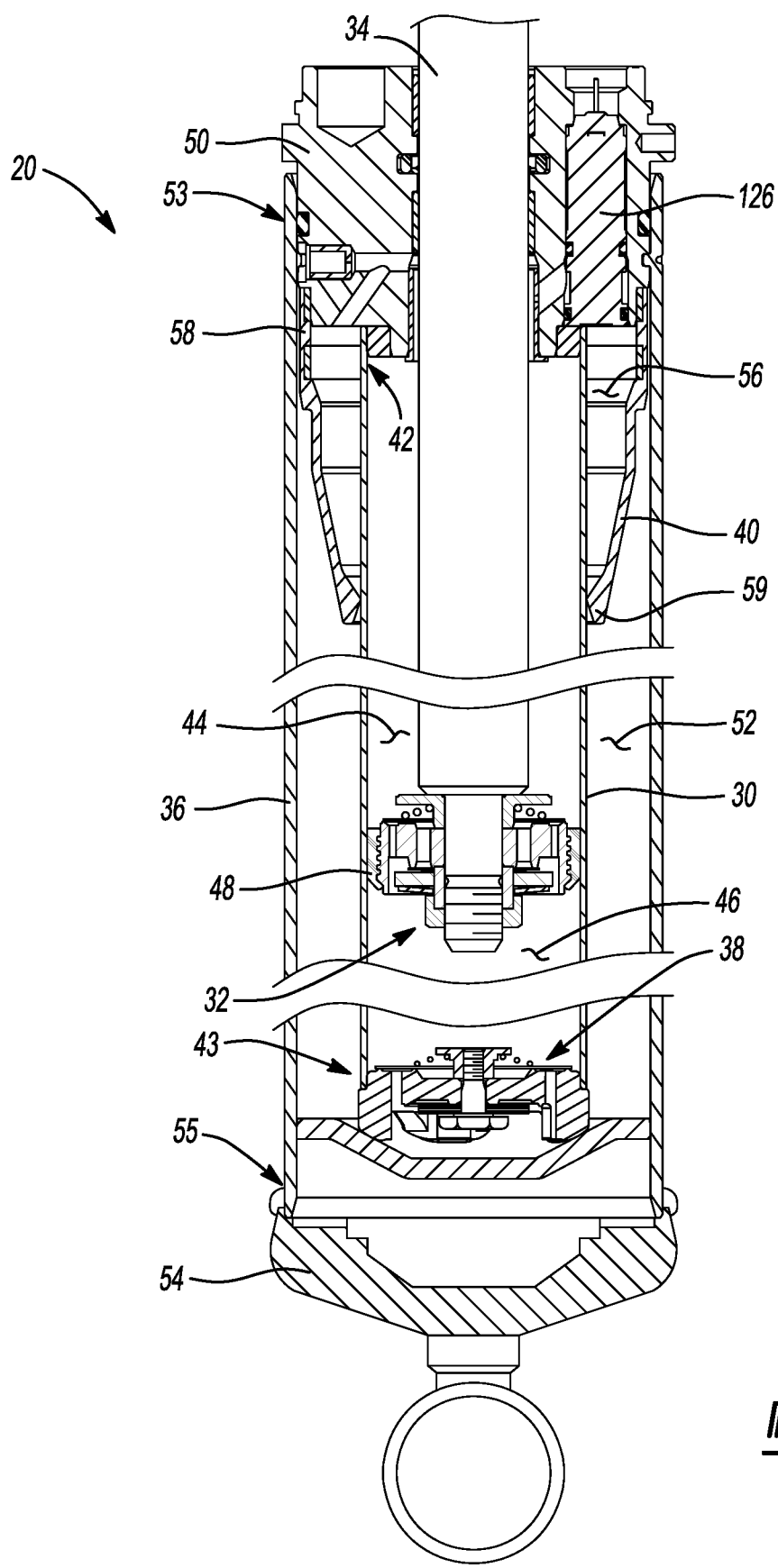
FIG. 2 is a side cross-sectional view of a dual-tube shock absorber from FIG. 1, which incorporates the damper baffle tube of the present disclosure.

Referring now to FIG. 2, shock absorber 20 is shown in greater detail. While FIG. 2 illustrates only shock absorber 20, it is to be understood that shock absorber 26 also includes the damper design described below for shock absorber 20. Shock absorber 26 only differs from shock absorber 20 in the manner in which it is adapted to be connected to the sprung and unsprung masses of the vehicle 10. Shock absorber 20 comprises a pressure tube 30, a piston assembly 32, a piston rod 34, a reserve tube 36, a base valve assembly 38, and a damper baffle tube 40.

The pressure tube 30 extends longitudinally between a first pressure tube end 42 and a second pressure tube end 43. The piston assembly 32 is slidably disposed within pressure tube 30 and defines a first working chamber 44 and a second working chamber 46. The first working chamber 44 extends between the piston assembly 32 and the first pressure tube end 42 and the second working chamber 46 extends between the piston assembly 32 and the second pressure tube end 43. A seal 48 is disposed between piston assembly 32 and pressure tube 30 to permit sliding movement of piston assembly 32 with respect to pressure tube 30 without generating undue frictional forces as well as sealing the first working chamber 44 from the second working chamber 46. Piston rod 34 is attached to piston assembly 32 and extends through the first working chamber 44 and through a rod guide 50, which closes the first pressure tube end 42. Although other configurations are possible, in the illustrated example, the rod guide 50 includes a collar 51 that is received in and mates with the first pressure tube end 42 to provide a fluid-tight seal. The end of piston rod 34 opposite to piston assembly 32 is adapted to be secured to the sprung mass of the vehicle 10. Valving within the piston assembly 32 controls the movement of fluid between the first working chamber 44 and the second working chamber 46 during movement of piston assembly 32 within the pressure tube 30. Because piston rod 34 extends only through the first working chamber 44 and not the second working chamber 46, movement of the piston assembly 32 with respect to pressure tube 30 causes a difference in the amount of fluid displaced in the first working chamber 44 and the amount of fluid displaced in the second working chamber 46. The difference in the amount of fluid displaced is known as the "rod volume," which is regulated by flow through the base valve assembly 38.

The reserve tube 36 surrounds pressure tube 30 in a coaxial arrangement and defines a reservoir chamber 52 located between the pressure tube 30 and the reserve tube 36. The reserve tube 36 extends longitudinally between a first reserve tube end 53 and a second reserve tube end 55. The first reserve tube end 53 is attached to the rod guide 50. The second reserve tube end 55 is closed by a base cup 54, which is adapted to be connected to the unsprung mass of vehicle 10. However, it should be appreciated that the shock absorber 20 could be installed in the opposite orientation where the piston rod 34 is attached to the unsprung mass of the vehicle 10 and the base cup 54 is attached to the sprung mass of the vehicle 10. The base valve assembly 38 is disposed between the second pressure tube end 43 and the base cup 54 and controls the flow of fluid between the second working chamber 46 and the reservoir chamber 52. When the shock absorber 20 extends in length during an extension stroke (i.e., a rebound stroke), an additional volume of fluid is needed in the second working chamber 46 due to the "rod volume" concept. Thus, fluid will flow from the reservoir chamber 52 to the second working chamber 46 through the base valve assembly 38. When the shock absorber 20 compresses in length during a compression stroke, an excess of fluid must be removed from the second working chamber 46 due to the "rod volume" concept. Thus, fluid will flow from the second working chamber 46 to the reservoir chamber 52 through the base valve assembly 38.

The damper baffle tube 40 is positioned in the reservoir chamber 52 between the pressure tube 30 and the reserve tube 36. The damper baffle tube 40 has a first baffle tube end 58 and a second baffle tube end 59. The first baffle tube end 58 is attached to the rod guide 50 in a press fit. The second baffle tube end 59 is arranged in contact with the pressure tube 30. Accordingly, a baffle tube chamber 56 is defined between the pressure tube 30 and the damper baffle tube 40. After the shock absorber 20 has been primed, this annular space in the baffle tube chamber 56 is completely filled with liquid (e.g., hydraulic fluid/oil) at all times during operation of the shock absorber 20.

A portion of the reservoir chamber 52 adjacent to the second pressure tube end 43 contains liquid fluid such as hydraulic fluid or oil while a pressurized gas is positioned within a portion of the reservoir chamber 52 adjacent to the first pressure tube end 42.

Figure 3:
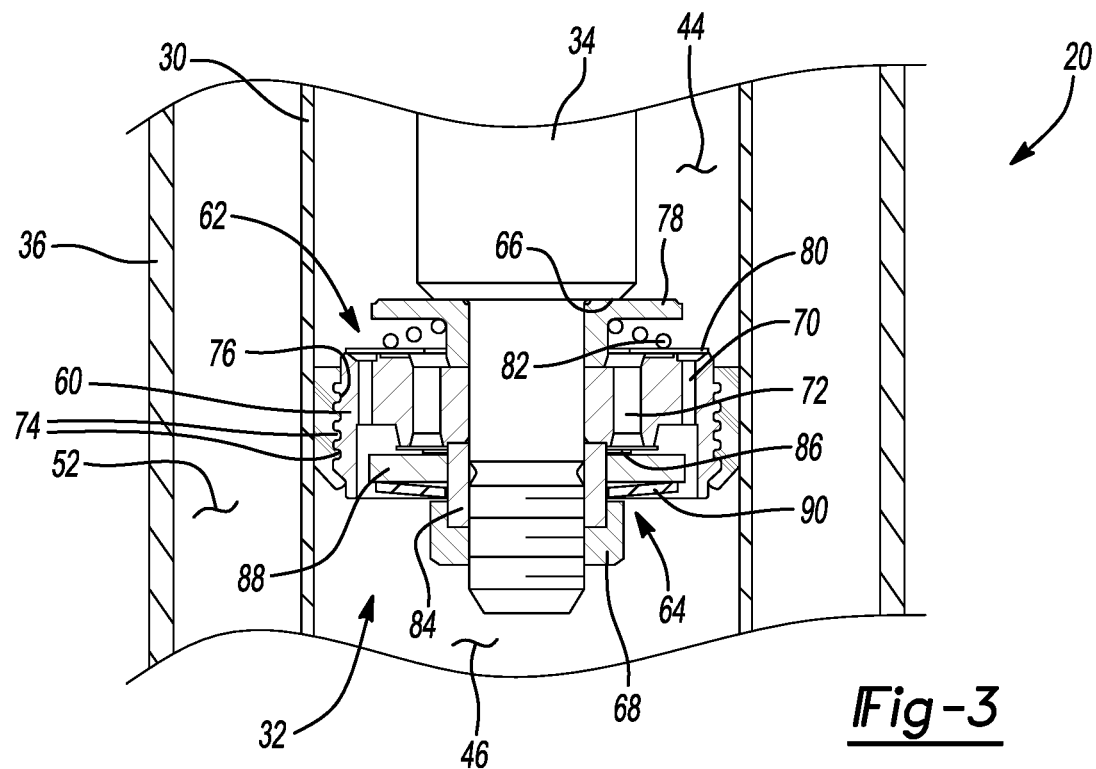
FIG. 3 is an enlarged side cross-sectional view of a piston assembly from the shock absorber illustrated in FIG. 2.

Referring now to FIG. 3, the piston assembly 32 includes a piston 60, a compression intake valve assembly 62 and a rebound valve assembly 64. The compression intake valve assembly 62 is assembled against a shoulder 66 of the piston rod 34. The piston 60 is assembled against the compression intake valve assembly 62 and the rebound valve assembly 64 is assembled against the piston 60. A nut 68 secures these components of the piston assembly 32 to the piston rod 34. The piston 60 defines a plurality of compression intake passages 70 and a plurality of rebound passages 72. Seal 48 includes a plurality of ribs 74 that mate with a plurality of annular grooves 76 in the piston 60 to retain the seal 48 during sliding movement of the piston assembly 32.

The compression intake valve assembly 62 is a passive valve that is comprised of a retainer 78, a valve disc 80, and a spring 82. The retainer 78 is positioned between the shoulder 66 of the piston rod 34 and the piston 60 in an abutting relationship. The valve disc 80 abuts the piston 60 and closes the compression intake passages 70 while leaving the rebound passages 72 open. The spring 82 is disposed between the retainer 78 and the valve disc 80 to bias the valve disc 80 against the piston 60. During a compression stroke, fluid in the second working chamber 46 is pressurized causing fluid pressure to react against the valve disc 80. When the fluid pressure acting against the valve disc 80 overcomes the biasing load of spring 82, the valve disc 80 separates from piston 60 to open the compression intake passages 70 and allow fluid flow from the second working chamber 46 to the first working chamber 44. The spring 82 only exerts a light load on the valve disc 80 such that the damping characteristics of the shock absorber 20 during a compression stroke are primarily controlled by the base valve assembly 38, which controls the flow of fluid from the second working chamber 46 to the reservoir chamber 52 due to the "rod volume" concept. During a rebound stroke, the compression intake passages 70 are closed by the valve disc 80.

The rebound valve assembly 64 is a passive valve that is comprised of a spacer 84, a plurality of valve discs 86, a retainer 88, and a spring 90. The spacer 84 is threadingly received on the piston rod 34 and is disposed between the piston 60 and the nut 68. The spacer 84 retains the piston 60 and the compression intake valve assembly 62 while permitting the tightening of the nut 68 without compressing either the valve disc 80 or valve discs 86. The retainer 78, piston 60, and spacer 84 provide a continuous solid connection between the shoulder 66 of the piston rod 34 and the nut 68 to facilitate the tightening and securing of the nut 68 to the spacer 84 and thus to the piston rod 34. Valve discs 86 are slidingly received on the spacer 84 and abut the piston 60 to close the rebound passages 72 while leaving the compression intake passages 70 open. The retainer 88 is also slidingly received on the spacer 84 and abuts the valve discs 86. The spring 90 is assembled over the spacer 84 and is disposed between the retainer 88 and the nut 68, which is threadingly received on the spacer 84. The spring 90 biases the retainer 88 against the valve discs 86 and the valve discs 86 against the piston 60. When fluid pressure is applied to the valve discs 86 during a rebound stroke, they will elastically deflect at the outer peripheral edge to open the rebound passages 72. During a compression stroke, the rebound passages 72 are closed by the valve discs 86. A shim (not shown) is located between the nut 68 and the spring 90 to control the preload for the spring 90 and thus the blow off pressure. Thus, the calibration for the blow off feature of the rebound valve assembly 64 is separate from the calibration for the compression intake valve assembly 62. In the illustrated embodiment, both the compression intake valve assembly 62 and the rebound valve assembly 64 form the piston valve assembly 62, 64; however, it should be appreciated that the compression intake valve assembly 62 or the rebound valve assembly 64 could be deleted leaving just one valve assembly on the piston 60.

During an extension stroke (i.e., a rebound stroke), fluid in the first working chamber 44 is pressurized causing fluid pressure to react against the valve discs 86. Prior to the deflecting of the valve discs 86, a bleed flow of fluid flows through a bleed passage (not shown) defined between the valve discs 86 and the piston 60. When the fluid pressure reacting against the valve discs 86 overcomes the bending load for the valve discs 86, the valve discs 86 elastically deflect opening the rebound passages 72, which allows fluid to flow from the first working chamber 44 to the second working chamber 46. The stiffness of the valve discs 86 and the size of rebound passages 72 will determine the damping characteristics for shock absorber 20 in extension/rebound stokes. When the fluid pressure within the first working chamber 44 reaches a predetermined level, the fluid pressure will overcome the biasing load of spring 90 causing axial movement of retainer 88 and the plurality of valve discs 86. The axial movement of the retainer 88 and valve discs 86 fully opens the rebound passages 72, thus allowing the passage of a significant amount of damping fluid creating a blowing off of the fluid pressure in the first working chamber 44, which prevents damage to the shock absorber 20 and/or vehicle 10.

Figure 4:
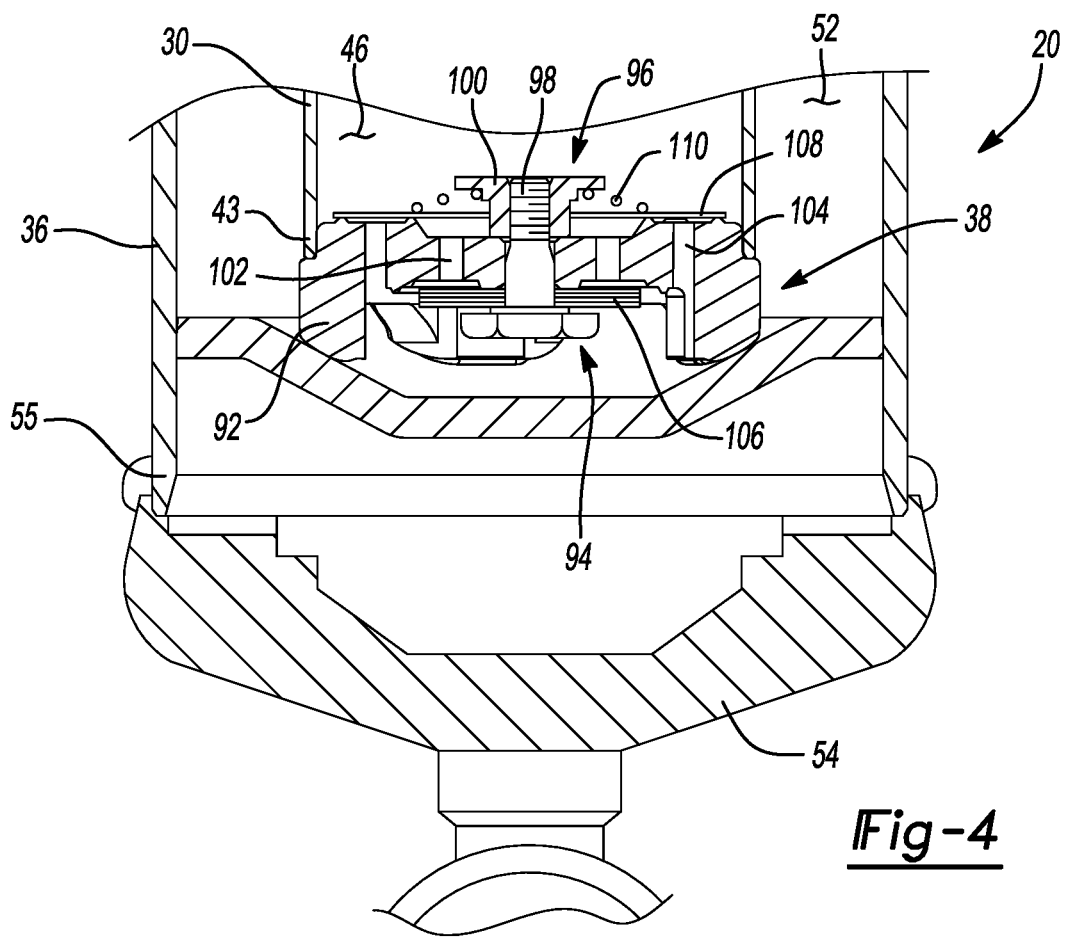
FIG. 4 is an enlarged side cross-sectional view of a base valve assembly from the shock absorber illustrated in FIG. 2.

Referring to FIG. 4, the base valve assembly 38 comprises a valve body 92, a compression valve assembly 94, and a rebound intake valve assembly 96. The compression valve assembly 94 and the rebound intake valve assembly 96 are attached to the valve body 92 using a bolt 98 and a nut 100. Tightening of the nut 100 biases the compression valve assembly 94 towards the valve body 92. The valve body 92 defines a plurality of compression passages 102 and a plurality of rebound intake passages 104.

The compression valve assembly 94 is a passive valve that is comprised of a plurality of valve discs 106 that are biased against the valve body 92 by the bolt 98 and nut 100. During a compression stroke, fluid in the second working chamber 46 is pressurized and the fluid pressure within the compression passages 102 reacts against the valve discs 106. Prior to the deflection of the valve discs 106, a bleed flow of fluid will flow through a bleed passage (not shown) defined between the valve discs 106 and the valve body 92. The fluid pressure reacting against the valve discs 106 will eventually open the compression passages 102 by deflecting the valve discs 106 in a manner similar to that described above for the rebound valve assembly 64. The compression intake valve assembly 62 will allow fluid flow from the second working chamber 46 to the first working chamber 44 and only the "rod volume" will flow through the compression valve assembly 94. The damping characteristics for the shock absorber 20 during a compression stroke are therefore primarily determined by the compression valve assembly 94 of the base valve assembly 38.

The rebound intake valve assembly 96 is a passive valve that is comprised of a valve disc 108 and a valve spring 110. The valve disc 108 abuts the valve body 92 and closes the rebound intake passages 104. The valve spring 110 is disposed between the nut 100 and the valve disc 80 to bias the valve disc 108 against the valve body 92. During a rebound stroke, fluid in the second working chamber 46 is reduced in pressure causing fluid pressure in the reservoir chamber 52 to react against the valve disc 108. When the fluid pressure acting against the valve disc 108 overcomes the biasing load of the valve spring 110, the valve disc 108 separates from the valve body 92 to open the rebound intake passages 104 and allow fluid flow from the reservoir chamber 52 to the second working chamber 46. The valve spring 110 exerts only a light load on the valve disc 108 such that the damping characteristics of the shock absorber 20 during a rebound stroke are primarily controlled by the rebound valve assembly 64.

Figure 5:
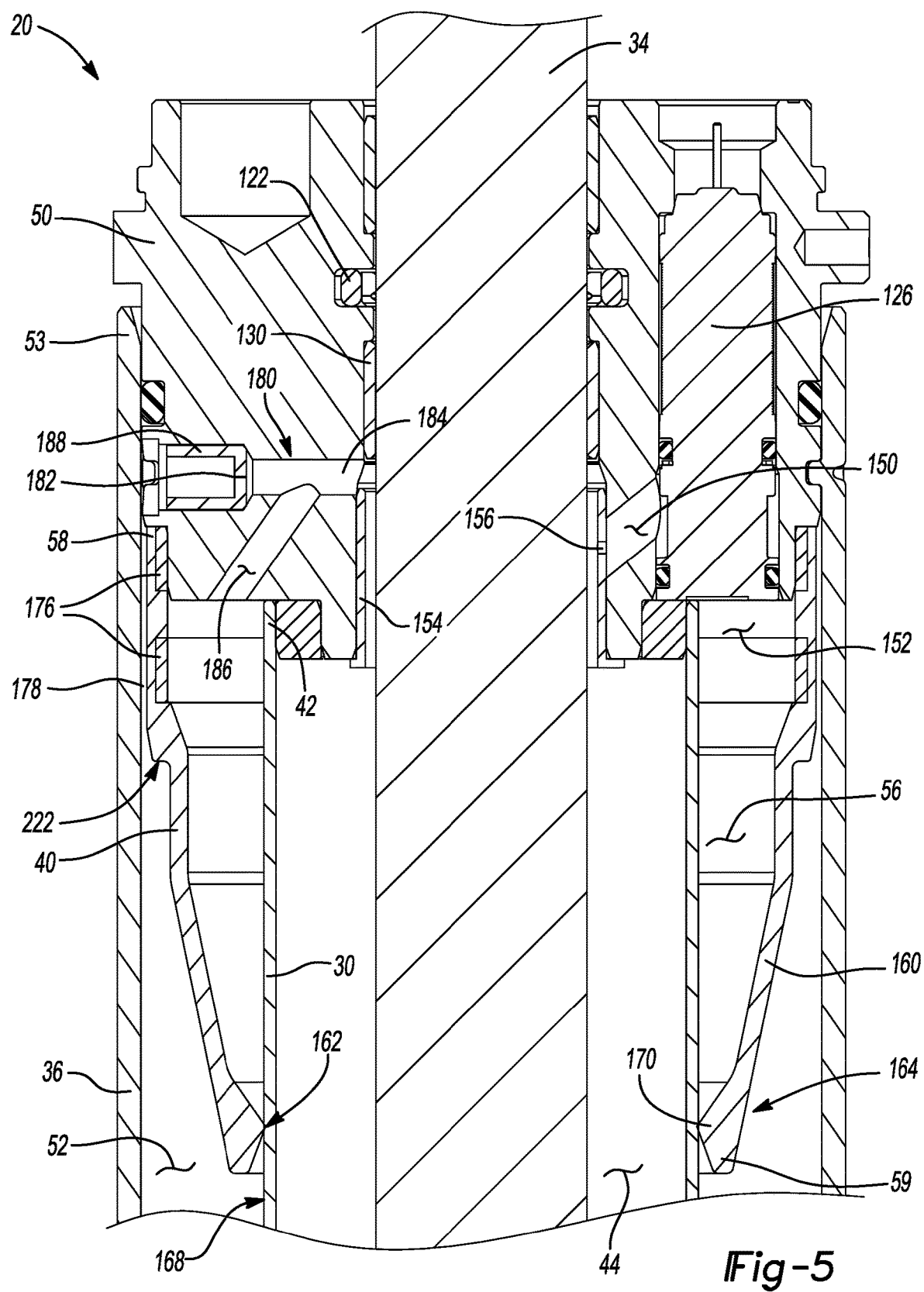
FIG. 5 is an enlarged side cross-sectional view of the damper baffle tube and rod guide of the shock absorber illustrated in FIG. 2.

Referring now to FIG. 5, at least part of the rod guide 50 is received in the first pressure tube end 42 and the second reserve tube end 53. A seal 122 is mounted inside the rod guide 50. The seal 122 abuts the piston rod 34 in a sliding fit. A bushing 130, assembled into the rod guide 50, accommodates the sliding motion of the piston rod 34 while also providing a sealing function for the piston rod 34.

One or more electromechanical valves 126 are housed inside the rod guide 50. Each electromechanical valve 126 includes an inlet 150 that is positioned in fluid communication with the first working chamber 44 and an outlet 152 that is positioned in fluid communication with the baffle tube chamber 56. Although other configurations are possible, in the illustrated embodiment, there are a total of three normally-closed electromechanical valves 126. When no power is provided to the electromechanical valves 126, the damping characteristics of the shock absorber 20 are defined by the piston valve assembly 62, 64 and the base valve assembly 38. When power is supplied to the electromechanical valves 126, fluid in the first working chamber 44 can flow from the inlet 150 of each electromechanical valve 126 to the outlet 152, into the baffle tube chamber 56, and then into the reservoir chamber 52. This fluid flow through the electromechanical valves 126 reduces (i.e., softens) the damping characteristics of the shock absorber 20 in both the compression and extension (i.e., rebound) strokes.

While the present disclosure illustrates only one of the electromechanical valves 126, it should be appreciated that the other electromechanical valves 126 are positioned at other circumferentially spaced positions within the rod guide 50 that are not visible in the cross-sections shown in the drawings. It should also be appreciated that any number of electromechanical valves 126 can be used, including a single electromechanical valve. It is also contemplated that other electromechanical valves, including normally open electromechanical valves, may be incorporated into the shock absorber 20 of the present disclosure.

Still referring to FIG. 5, an orifice tube 154, positioned in the rod guide 50, extends annularly about the piston rod 34. The orifice tube 154 is spaced radially outward of the piston rod 34 and includes an inlet orifice 156 that permits fluid flow from the space between the piston rod 34 and the orifice tube 154 into the inlet 150 of the electromechanical valve 126. The size of the inlet orifice 156 is tunable based on the degree to which the electromechanical valve 126 will lessen (i.e., soften) the damping characteristics provided by the piston valve assembly 62, 64 and the base valve assembly 38.

The damper baffle tube 40 includes a compliant portion 160 surrounding the pressure tube 30. The compliant portion 160 includes a sealing surface 162, positioned at the second baffle tube end 59, that is configured to move into and out of contact with the pressure tube 30 in response to fluctuations in fluid pressure in the baffle tube chamber 56. As a result, the compliant portion 160 of the damper baffle tube 40 forms a check valve 164 that retains hydraulic fluid in the baffle tube chamber 56. Stated another way, the damper baffle tube 40 holds a constrained volume of hydraulic fluid at the outlet 152 of the electromechanical valve(s) 126.

The compliant portion 160 of the damper baffle tube 40 is made of an elastomeric material and has a compliant portion stiffness. The sealing surface 162 of the damper baffle tube 40 moves away from the pressure tube 30 when the pressure differential between the baffle tube chamber 56 and the reservoir chamber 52 exerts a fluid force on the compliant portion 160 of the damper baffle tube 40 that exceeds the compliant portion stiffness. This causes the compliant portion 160 to elastically flex, pulling the sealing surface 162 away from the pressure tube 30 to create a gap 166 (see FIGS. 7-8) between the sealing surface 162 and an outer surface 168 of the pressure tube 30. Stated another way, the compliant portion stiffness of the damper baffle tube 40 provides a check valve opening pressure where the sealing surface 162 moves away from the pressure tube 30 and permits the hydraulic fluid in the baffle tube chamber 56 to flow into the reservoir chamber 52. The compliant portion 160 of the damper baffle tube 40 may be configured such that the sealing surface 162 lifts away from the outer surface 168 of the pressure tube 30 in a uniform manner so that the gap 166 has an annular shape. Alternatively, only a portion (e.g., one side) of the compliant portion 160 may lift away from the outer surface 168 of the pressure tube 30 in a burping action. In some cases, the thickness and/or stiffness of the compliant portion 160 can be configured to promote the release of fluid along one or more circumferential locations about the pressure tube 30.

The elastomeric material and the geometry of the compliant portion of the damper baffle tube 40 are selected so that the compliant portion stiffness does not materially affect the damping characteristics of the shock absorber 20. As a result, the piston valve assembly 62, 64 has a piston valve opening pressure, the base valve assembly 38 has a base valve opening pressure, and the check valve opening pressure is less than both the piston valve opening pressure and the base valve opening pressure. It should be appreciated that various combinations of elastomeric materials and geometries can be used. By way of example and without limitation, the elastomeric material forming at least the compliant portion 160 of the damper baffle tube 40 may be natural butyl rubber or fluorosilicone. Although other geometries are possible, in the illustrated example, the compliant portion 160 of the damper baffle tube 40 has an inwardly tapering shape, forming a tubular frusto-conical structure, and the sealing surface 162 of the damper baffle tube 40 is defined by an inwardly directed annular lip 170.

With additional reference to FIGS. 6-8, the gap 166 between the sealing surface 162 of the damper baffle tube 40 and the pressure tube 30 directs a laminar flow of hydraulic fluid 172 from the baffle tube chamber 56 into the reservoir chamber 52 along the outer surface 168 of the pressure tube 30 to reduce aeration of the hydraulic fluid 172 in the reservoir chamber 52. In addition, the outlet(s) 152 of the electromechanical valve(s) 126 have a first cross-sectional flow area and the gap 166 between the sealing surface 162 of the damper baffle tube 40 and the pressure tube 30 has a second cross-sectional flow area that is larger than the first cross-sectional flow area. As a result, the flow velocity of the hydraulic fluid 172 is less through the gap 166 than through the outlet(s) 152 of the electromechanical valve(s) 126. It should be appreciated that in configurations where multiple electromechanical valves 126 are used, the first cross-sectional flow area equals the sum total of the cross-sectional areas for the outlets 152 of the electromechanical valves 126.

Advantageously, the damper baffle tube 40 of the present disclosure reduces aeration of the hydraulic fluid 172 in the reservoir chamber 52 while also reducing air entrapment in the first working chamber 44 and the baffle tube chamber 56. The check valve 164 created by the compliant portion 160 of the damper baffle tube 40 allows gas/air pockets 174 in the first working chamber and/or the damper baffle tube chamber 56 to escape into the reservoir chamber 52 within a few priming strokes (e.g., 5 strokes or less) of the shock absorber 20. It can take much longer (e.g., 20 strokes or more) to purge gas/air pockets 174 out the first working chamber 44 and baffle tube chamber 56 in prior designs where fluid volume is not retained in the baffle tube chamber (i.e., in designs where fluid is free to run out of the baffle tube chamber).

In prior designs, where no baffle tube is utilized, hydraulic fluid exits the outlet(s) 152 of the electromagnetic valve(s) 126 directly into the reservoir chamber 52 at high velocity in a turbulent flow, which may lead to aeration of the hydraulic fluid 172 in the reservoir chamber 52. The damper baffle tube 40 of the present disclosure reduces aeration of the hydraulic fluid 172 entering the reservoir chamber 52 through the electromechanical valve(s) 126 by addressing both of these problems. First, because second cross-sectional flow area of the gap 166 between the sealing surface 162 of the damper baffle tube 40 and the outer surface 168 of the pressure tube 30 is larger than the first cross-sectional flow area of the outlet(s) 152 of the electromechanical valve(s) 126, hydraulic fluid 172 exits the baffle tube chamber 56 at a lower velocity than the hydraulic fluid 172 exiting the outlet(s) 152 of the electromechanical valve(s) 126, which reduces aeration. Second, the shape and position of the gap 166 between the sealing surface 162 of the damper baffle tube 40 and the outer surface 168 of the pressure tube 30 directs/channels the hydraulic fluid 172 exiting the baffle tube chamber 56 to flow smoothly along the outer surface 168 of the pressure tube 30 in a laminar fashion. This laminar "waterfall" of fluid flow along the outer surface 168 of the pressure tube 30 generates much less aeration in the reservoir chamber 52 compared to prior designs where a jet or spray of high velocity, turbulent flow of hydraulic fluid exited through the outlet(s) 152 of the electromechanical valve(s) 126 directly into the reservoir chamber 52.

The damper baffle tube 40 may be mounted inside the reserve tube 36 in a variety of different ways. For example, in the configuration shown in FIG. 5, the first baffle tube end 58 is sealingly attached to the rod guide 50. In this example, the first baffle tube end 58 includes a metal sleeve 176 that is press-fit onto the rod guide 50. In accordance with this configuration, the compliant portion 160 of the damper baffle tube 40 is made of an overmolded elastomeric material. The first baffle tube end 58 is spaced radially inward of the reserve tube 36 defining a clearance volume 178 between the damper baffle tube 40 and the reserve tube 36. This clearance volume 178 is disposed in fluid communication with the reservoir chamber 52. A bleed flow path 180 extends through the rod guide 50 from the first working chamber 44 and/or the baffle tube chamber 56 to the clearance volume 178 between the damper baffle tube 40 and the reserve tube 36. Flow through the bleed flow path 180 is controlled/restricted by a bleed orifice 182. The bleed orifice 182 is sized to permit the passage of gas/air from the first working chamber 44 and/or the baffle tube chamber 56 to the clearance volume 178 and thus the reservoir chamber 52 with minimal oil leakage (i.e., weapage). The bleed flow path 180 therefore helps clear gas/air entrapped in the first working chamber 44 and/or the baffle tube chamber 56, which further reduces the number of strokes required to prime the shock absorber 20.

In the embodiment illustrated in FIG. 5, the rod guide 50 includes a first bleed passage 184 and a second bleed passage 186 that combine to form the bleed flow path 180. The first bleed passage 184 extends through the rod guide 50 between the space in the first working chamber 44 between the orifice tube 154 and the piston rod 34 and the clearance volume 178 in the reservoir chamber 52 between the damper baffle tube 40 and the reserve tube 36. The second bleed passage 186 extends through the rod guide 50 between the baffle tube chamber 56 and the first bleed passage 184. As a result, gas/air entrapped in the first working chamber 44 and the baffle tube chamber 56 can bleed out into the clearance volume 178 and therefore the reservoir chamber 52. An insert 188 is positioned within the first bleed passage 184 between the second bleed passage 186 and the clearance volume 178. The bleed orifice 182 is provided in the insert 188, which as explained above, prevents hydraulic fluid 172 from freely flowing from the first working chamber 44 to the reservoir chamber 52 and therefore bypassing the electromechanical valve(s) 126 and baffle tube chamber 56. It should be appreciated that other alternative designs are possible where the first or second bleed passage 184, 186 is eliminated. It should also be appreciated that the bleed flow path 180 may be defined by more than the two bleed passages 184, 186 illustrated in FIG. 5.

FIGS. 6-11 illustrate the working principles of shock absorber 20. FIGS. 6-8 show the shock absorber 20 before and during priming and FIGS. 9-11 show the shock absorber 20 after priming. With reference to FIG. 6, the shock absorber 20 is shown after initial assembly. Hydraulic fluid 172 occupies the first and second working chambers 44, 46, the reservoir chamber 52, and the baffle tube chamber 56. A portion of the reservoir chamber 52 that is not occupied by the hydraulic fluid 172 is occupied by a gas 190. In the illustrated example, where the shock absorber 20 is oriented with the first working chamber 44 positioned above the second working chamber 46, the gas 190 resides in the portion of the reservoir chamber 52 near the rod guide 50 while the hydraulic fluid 172 resides in the portion of the reservoir chamber 52 near the base valve assembly 38. Once assembled, the damper baffle tube 40 is disposed in the portion of the reservoir chamber 52 that contains gas 190 and the second baffle tube end 59 is spaced longitudinally from the portion of the reservoir chamber 52 that contains hydraulic fluid 172. In other words, the second baffle tube end 59 is longitudinally spaced from the oil level 192 in the reservoir chamber 52. Unlike prior designs where the length of the baffle tube was dictated by the length of the pressure tube 30, in the present design, the same damper baffle tube 40 can be used across a range of different shock absorbers 20 with pressure tubes 30 of various lengths and therefore provides a more cost effective solution from a manufacturing perspective. It should be appreciated that the length and shape of the damper baffle tube 40 can be made longer or shorter than that shown in the drawings and that the damper baffle tube 40 could be made to have a non-circular cross-sectional shape.

As shown in FIG. 6, gas/air pockets 174 are typically present adjacent the rod guide 50 in both the first working chamber 44 and the baffle tube chamber 56 after initial assembly of the shock absorber 20. In order for the shock absorber 20 to operate properly and for the electromechanical valve(s) 126 to function correctly, these gas/air pockets 174 must be bled from the first working chamber 44 and the baffle tube chamber 56 by priming the shock absorber 20. The shock absorber 20 of the present design can be primed by stroking the shock absorber 20 in either the extension direction (FIG. 7) or the compression direction (FIG. 8). During both extension and compression, hydraulic fluid 172 and any gas/air 190 in the first working chamber 44 is forced into the inlet(s) 150 of the electromechanical valve(s) 126. When the electromechanical valve(s) 126 is open, the hydraulic fluid 172 and/or gas/air 190 enters the baffle tube chamber 56 and the pressure within the baffle tube chamber 56 begins to rise. Once this pressure exceeds the check valve opening pressure, hydraulic fluid 172 and any gas/air 190 in the baffle tube chamber 56 exit through the gap 166 between the sealing surface 162 of the damper baffle tube 40 and the pressure tube 30 and enter the reservoir chamber 52. As a result, the gas/air pockets 174 are purged out of the first working chamber 44 and the baffle tube chamber 56 during priming and combine with the gas 190 in the portion of the reservoir chamber 52 adjacent the rod guide 50. In other words, the compliant portion 160 of the damper baffle tube 40 operates as a burp valve that releases the gas/air pockets 174 into the reservoir chamber 52.

FIG. 9 illustrates the shock absorber 20 after it has been fully primed. At this point, there are no gas/air pockets 174 in the first working chamber 44 or the baffle tube chamber 56. Once primed, only a portion of the reservoir chamber 52 contains gas/air 190. The shock absorber 20 is now ready to properly control extension (FIG. 10) and compression (FIG. 11) movements.

Referring to FIGS. 7 and 10, during an extension stroke (i.e., rebound stroke) of the shock absorber 20, the piston 60 moves in extension direction 200 towards the rod guide 50. As a result, the length of the piston rod 34 positioned with the pressure tube 30 decreases along with the associated volume of hydraulic fluid 172 that is displaced by the piston rod 34 (i.e., the rod volume decreases). Hydraulic fluid 172 in the first working chamber 44 passes through the rebound passages 72 in piston 60 along flow 202 and into the second working chamber 46. This flow 202 is controlled by the rebound valve assembly 64, as described above. At the same time, hydraulic fluid 172 in the reservoir chamber 52 passes through the rebound intake passages 104 in the base valve assembly 38 along flow 204 and into the second working chamber 46. This flow 204 is controlled by the rebound intake valve assembly 96, as described above. Flow 204 therefore replaces the decrease in rod volume. When the electromechanical valve(s) 126 open, hydraulic fluid 172 in the first working chamber 44 passes into the baffle tube chamber 56 and then into the reservoir chamber 52 along flow 206.

Referring to FIGS. 8 and 11, during a compression stroke of the shock absorber 20, the piston 60 moves in compression direction 208 towards the base valve assembly 38. The length of the piston rod 34 positioned with the pressure tube 30 increases along with the associated volume of hydraulic fluid 172 that is displaced by the piston rod 34 (i.e., the rod volume increases). Hydraulic fluid 172 in the second working chamber 46 passes through the compression passages 102 in base valve assembly 38 along flow 210 and into the reservoir chamber 52. This flow 210 is controlled by the compression valve assembly 94, as described above. At the same time, hydraulic fluid 172 in the second working chamber 46 passes through the compression intake passages 70 in the piston 60 along flow 212 and into the first working chamber 44. This flow 212 is controlled by the compression intake valve assembly 62, as described above. Hydraulic fluid 172 in the flow 212 out of the second working chamber 46 is replaced by the increase in rod volume. When the electromechanical valve(s) 126 open, hydraulic fluid 172 in the first working chamber 44 passes into the baffle tube chamber 56 and then into the reservoir chamber 52 along flow 206.

Figure 12:
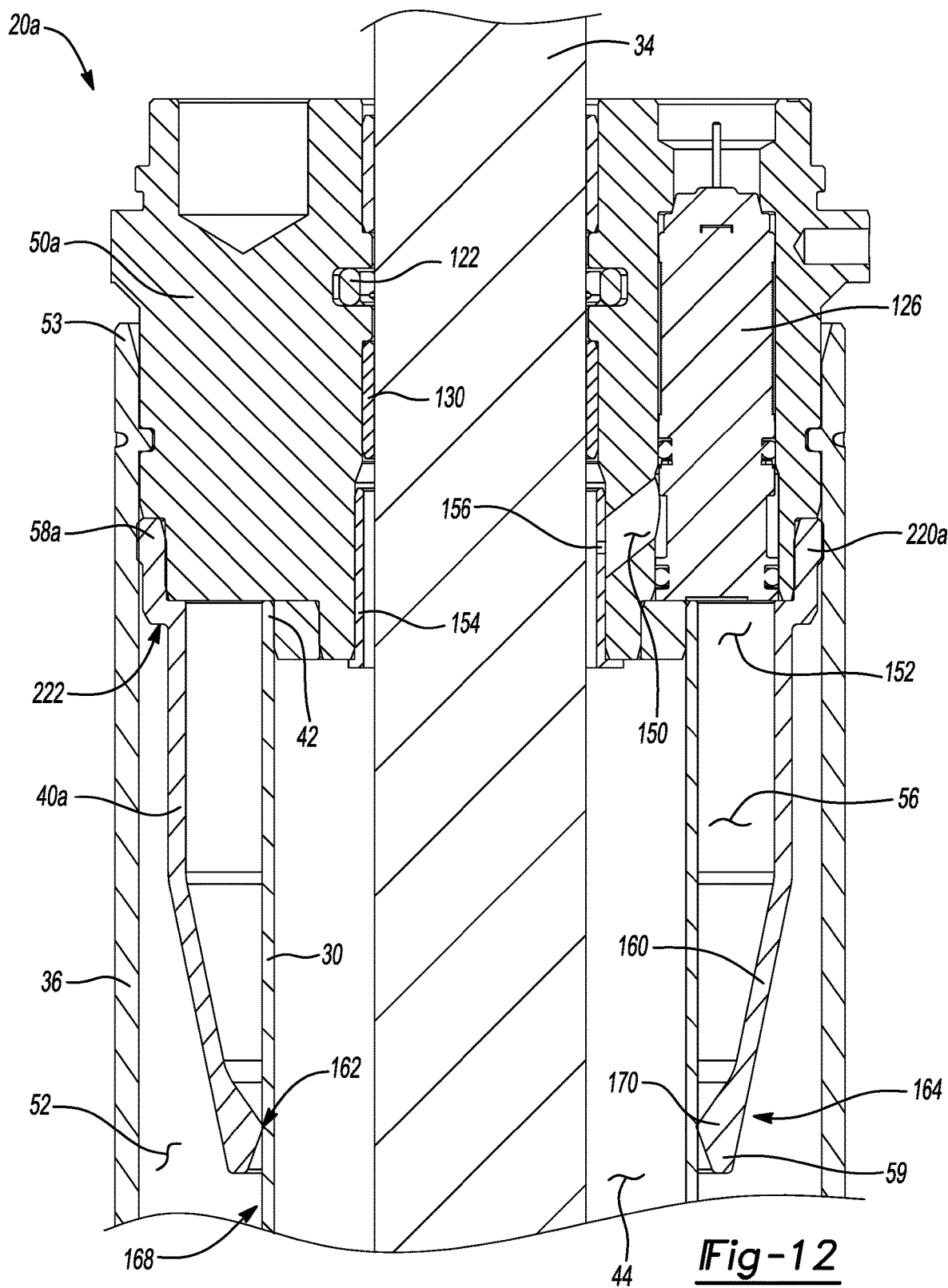
FIG. 12 is an enlarged side cross-sectional view of another damper baffle tube and rod guide that have been constructed in accordance with other aspects of the present disclosure.
Figure 13:
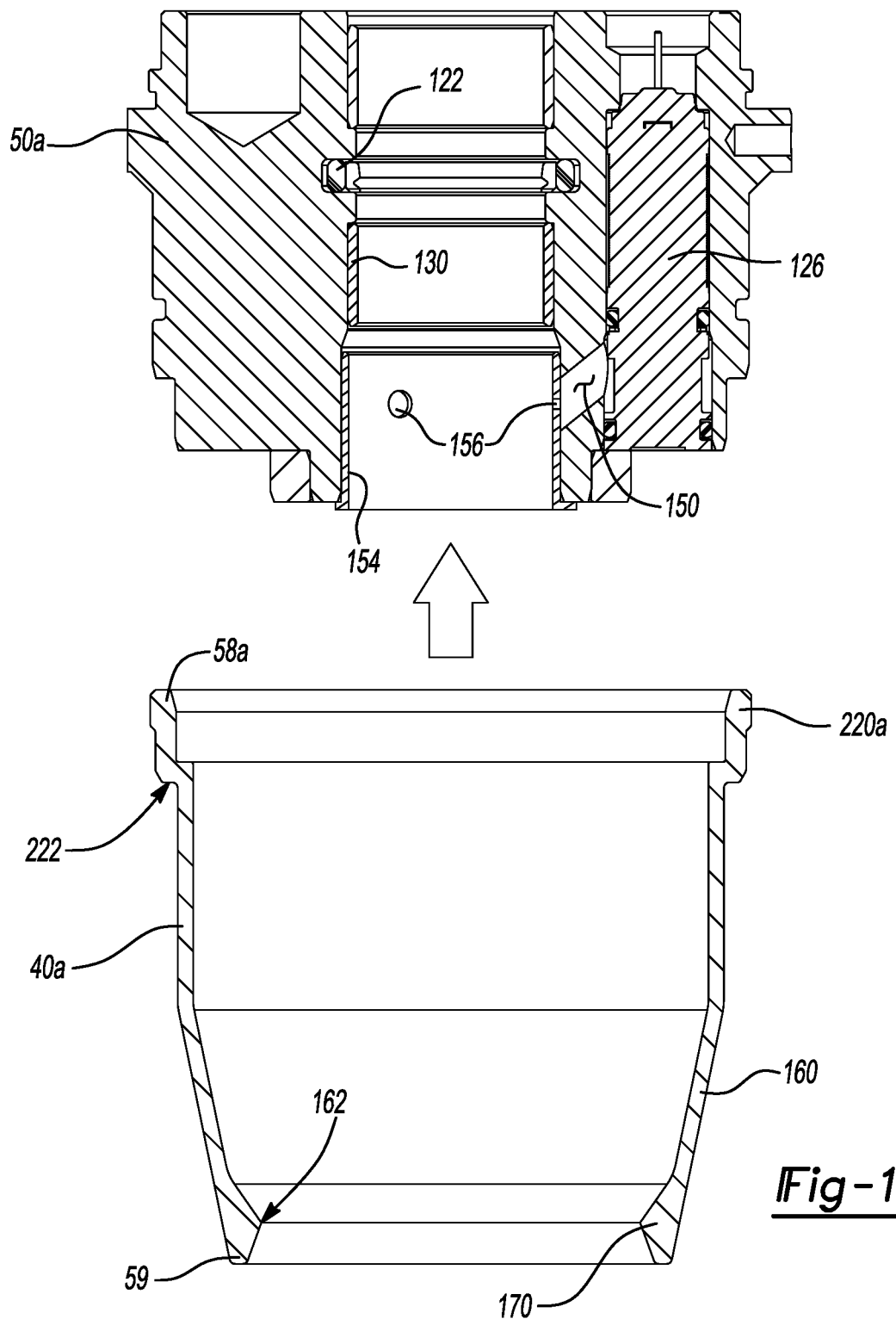
FIG. 13 is an exploded side cross-sectional view of the damper baffle tube and rod guide illustrated in FIG. 12.
Figure 14:
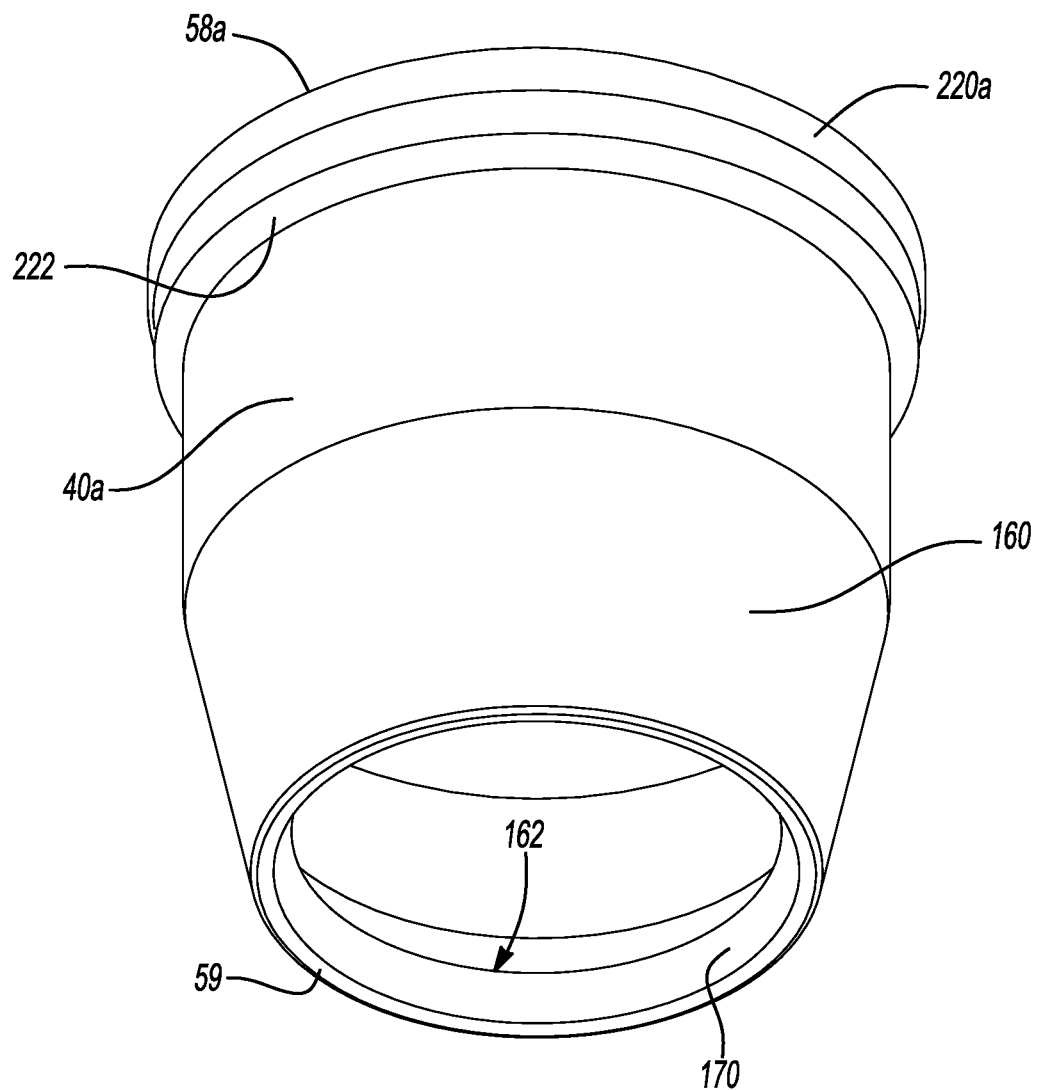
FIG. 14 is a side perspective view of the damper baffle tube illustrated in FIG. 12.

With reference to FIGS. 12-14, another shock absorber 20a with a different damper baffle tube 40a is illustrated. Many of the elements of the shock absorber 20a shown in FIGS. 12-14 are the same or substantially the same as the elements of the shock absorber 20 shown in FIGS. 1-11, except as noted below. Equivalent elements shared between the embodiments have corresponding reference numbers. The letter "a" has been appended to new elements and to modified elements that are different from those shown in FIGS. 1-11.

The damper baffle tube 40a shown in FIGS. 12-14 has a one-piece structure and is made of an elastomeric material. The metal sleeve 176 shown in FIGS. 1-11 has been eliminated. Instead, the diameter of first baffle tube end 58a is made slightly smaller than the corresponding diameter of rod guide 50a so that the elastomeric material of the damper baffle tube 40a stretches as the first baffle tube end 58a is installed on the rod guide 50a creating an interference fit between the damper baffle tube 40a and the rod guide 50a. Optionally, the first baffle tube end 58a includes an integrated static seal 220a where the wall thickness of the damper baffle tube 40a is increased. The integrated static seal 220a is squeezed between the rod guide 50a and the reserve tube 36 during assembly to seal the reservoir chamber 52 (i.e., to provide a seal between the rod guide 52a and the reserve tube 36). In the design shown in FIGS. 12-14, the bleed passages 184, 186 and insert 188 shown in FIGS. 1-11 have also been eliminated. As a result, all gas/air pockets 174 in the first working chamber 44 and/or the baffle tube chamber 56 pass through the gap 166 between the sealing surface 162 of the compliant portion 160 of the damper baffle tube 40a and the outer surface 168 of the pressure tube 30 during priming.

In both the configuration shown in FIGS. 1-11 and the configuration shown in FIGS. 12-14, the damper baffle tube 40, 40a includes a shoulder 222. The shoulder 222 is configured to mate with a tubular installation tool (not shown) that can be used to hold and press the damper baffle tube 40, 40a onto the rod guide 50, 50a. The shock absorbers 20, 20a disclosed herein may be assembled in various ways. For example, the damper baffle tube 40, 40a may be mounted to the rod guide 50, 50a to create a first sub-assembly. Then the first pressure tube end 42 can be inserted into the damper baffle tube 40, 40a and pressed onto the rod guide 50, 50a. Alternatively, the pressure tube 30, base valve assembly 38, and rod guide 50, 50a may be assembled together to create a second sub-assembly. The damper baffle tube 40, 40a may then be pulled over the base valve assembly 38 and the second pressure tube end 55 and slid up the pressure tube 30 until the first baffle tube end 58, 58a engages the rod guide 50, 50a. In either case, the rod guide 50, 50a, pressure tube 30, and damper baffle tube 40, 40a sub-assembly is then inserted into the first reserve tube end 53 until the first reserve tube end 53 engages the rod guide 50, 50a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
    a pressure tube extending between a first pressure tube end and a second pressure tube end;
    a piston attached to a piston rod, the piston slidably disposed within the pressure tube to define a first working chamber between the piston and the first pressure tube end and a second working chamber between the piston and the second pressure tube end, the piston including at least one fluid passage that connects the first working chamber with the second working chamber;
    a reserve tube disposed around the pressure tube that defines a reservoir chamber positioned between the pressure tube and the reserve tube;
    a damper baffle tube positioned radially outward from the pressure tube and defining a baffle tube chamber between the pressure tube and the damper baffle tube;
    at least one electromechanical valve positioned in fluid communication with the first working chamber and the baffle tube chamber,
    wherein the damper baffle tube includes a compliant portion surrounding the pressure tube with a sealing surface that is configured to move into and out of contact with the pressure tube in response to fluctuations in fluid pressure in the baffle tube chamber such that the compliant portion of the damper baffle tube forms a check valve that retains hydraulic fluid in the baffle tube chamber, and a rod guide attached to the first pressure tube end and supporting the piston rod, wherein the at least one electromechanical valve is positioned in the rod guide, the damper baffle tube including a first baffle tube end that is sealingly attached to the rod guide and a second baffle tube end that is formed by the compliant portion of the damper baffle tube, wherein the first baffle tube end is spaced radially inward of the reserve tube defining a clearance volume therebetween that is disposed in uninterrupted fluid communication with the reservoir chamber, the rod guide including at least one bleed passage extending between the clearance volume and at least one of the first working chamber and the baffle tube chamber.

2. The shock absorber of claim 1, wherein the first baffle tube end includes a metal sleeve that is press-fit onto the rod guide and wherein the compliant portion of the damper baffle tube is made of an overmolded elastomeric material.

3. The shock absorber of claim 1, wherein the first baffle tube end is made of an elastomeric material and is squeezed between the rod guide and the reserve tube to create an integrated static seal.

4. The shock absorber of claim 1, wherein the at least one electromechanical valve includes an inlet disposed in fluid communication with the first working chamber and an outlet disposed in fluid communication with the baffle tube chamber.

5. The shock absorber of claim 4, wherein the compliant portion of the damper baffle tube is made of an elastomeric material and has a compliant portion stiffness such that the damper baffle tube holds a constrained volume of hydraulic fluid at the outlet of the at least one electromechanical valve.

6. The shock absorber of claim 5, wherein the compliant portion stiffness provides a check valve opening pressure where the sealing surface moves away from the pressure tube and permits the hydraulic fluid in the baffle tube chamber to flow into the reservoir chamber.

7. The shock absorber of claim 6, further comprising:
a piston valve assembly that restricts fluid flow through the at least one fluid passage in the piston, the piston valve assembly having a piston valve opening pressure; and
a base valve assembly positioned at the second pressure tube end that restricts fluid flow between the second working chamber and the reservoir chamber, the base valve assembly having a base valve opening pressure,
wherein the check valve opening pressure is less than the piston valve opening pressure and the base valve opening pressure.

8. The shock absorber of claim 1, wherein the compliant portion of the damper baffle tube has an inwardly tapering shape.

9. The shock absorber of claim 1, wherein the sealing surface of the damper baffle tube is defined by an inwardly directed annular lip.

10. The shock absorber of claim 1, wherein the compliant portion of the damper baffle tube is made of natural butyl rubber or fluorosilicone.

11. The shock absorber of claim 1, wherein the damper baffle tube has a one-piece structure and is made of an elastomeric material.

* * * * *